(12) United States Patent
Mathias et al.

(10) Patent No.: US 6,792,760 B2
(45) Date of Patent: Sep. 21, 2004

(54) METHOD FOR OPERATING A TURBINE

(75) Inventors: Gernot Mathias, Waldshut-Tiengen (DE); Bozidar Seketa, Wettingen (CH)

(73) Assignee: Alstom Technology LTD, Baden (CH)

( * ) Notice: Subject to any disclaimer, the term of this patent is extended or adjusted under 35 U.S.C. 154(b) by 97 days.

(21) Appl. No.: 10/310,861

(22) Filed: Dec. 6, 2002

(65) Prior Publication Data

US 2003/0167773 A1 Sep. 11, 2003

Related U.S. Application Data

(60) Provisional application No. 60/363,043, filed on Mar. 11, 2002.

(51) Int. Cl.[7] .............................. F02C 9/00; F02C 7/22; F02C 7/268
(52) U.S. Cl. ............................. 60/773; 60/787; 60/790; 60/39.17; 60/39.183; 60/39.27; 60/778
(58) Field of Search .......................... 60/773, 774, 778, 60/39.27, 39.17, 39.183, 794, 787; 290/40 R, 40 A

(56) References Cited

U.S. PATENT DOCUMENTS

| | | | |
|---|---|---|---|
| 4,033,114 A | * | 7/1977 | Zaugg ........................ 60/778 |
| 4,043,120 A | * | 8/1977 | Hoffeins ....................... 60/787 |
| 4,270,344 A | | 6/1981 | Yu |
| 4,368,616 A | | 1/1983 | Abo et al. |
| 5,161,363 A | | 11/1992 | Klaass et al. |
| 6,637,207 B2 | * | 10/2003 | Konezciny et al. ........... 60/727 |

FOREIGN PATENT DOCUMENTS

| | | |
|---|---|---|
| DE | 2326145 | 12/1973 |
| DE | 2538756 | 3/1977 |
| DE | 2728382 | 1/1979 |
| DE | 3411444 A1 | 8/1985 |
| FR | 2718581 | 10/1995 |

* cited by examiner

Primary Examiner—Charles G. Freay
(74) Attorney, Agent, or Firm—Burns, Doane, Swecker & Mathis, L.L.P.

(57) ABSTRACT

A method of operating a turbine arranged in a compressed air energy storage power generation plant comprises an open-loop control of an air mass flow applied within a lower turbine speed range and a closed-loop control of the turbine speed within a higher turbine speed range. The open-loop control comprises the control of the air mass flow by means of air inlet valves and a free development of the turbine speed. The closed-loop control comprises the control of the turbine speed by means of a speed controller, which is acted upon by a speed limiting value determined according to the current air mass flow and a windage calculation. The speed controller activates a static frequency converter in the case that the turbine speed reaches values that are critical with respect to turbine windage or rotor dynamics.

7 Claims, 2 Drawing Sheets

METHOD FOR OPERATING A TURBINE

This application claims priority under 35 U.S.C. §119 to U.S. Provisional Application No. 60/363,043 entitled METHOD AND SYSTEM FOR OPERATION OF AIR EXPANSION TURBINE and filed on Mar. 11, 2002, the entire content of which is hereby incorporated by reference.

TECHNICAL FIELD

The invention pertains to a method of operating a turbine arranged in a compressed air energy storage (CAES) power generation plant and in particular to a method for a controlled start-up and shut-down of such a turbine.

BACKGROUND ART

A typical compressed air energy storage (CAES) power generation plant as shown in FIG. 1 comprises a cavern (C) for compressed air, which is used to drive a single-shaft expansion turbine consisting of an air expansion turbine (AT) followed by a combustion chamber (CC). It furthermore comprises a gas turbine (GT), which during normal operation drives a fixedly coupled generator (G) in synchronisation with the mains.

Speed and power control of the turbine is usually realised by a coordinated control of valves, in particular of the air inlet valves (AV) at the air turbine inlet as well as the fuel inlet valves (FV) at the combustion chamber. The following disclosure pertains to a CAES power generation plant as shown in the schematic of FIG. 1 as well as variants thereof. These are for an example CAES power plants with an additional combustion chamber arranged preceding the air turbine (AT) or a recuperator prior to the air turbine for preheating the pressurized air from the cavern.

The single-shaft turbine is started up from a stand-still or from a turning operation to synchronization, for which an open or closed-loop speed control is implemented. For part of this start-up procedure, the CAES plant comprises in addition a static frequency converter (SFC), that is arranged in parallel to the generator-to-mains breaker switch (S). The electrical brake torque of the SFC counteracts the drive torque of the turbine while the generator is not yet synchronized. It can also be used in order to shorten the coast-down procedure following a separation from the mains (M). The power output after the sychronization of the turbine occurs in conventional manner via the generator to the electrical consumer mains.

The start-up of a turbine comprises several steps:

Purging of the turbine and combustion chamber using preheated air from the cavern and via the air inlet valve.

Reduction of the purge air flow rate through the air inlet valve followed by ignition of the combustor.

Acceleration of the turbine by control of the air flow rate coordinated with the control of the combustor fuel flow rate while maintaining given process values such as gas turbine inlet temperature and amounts of toxic components in the exhaust gases from the turbine. At this step, critical operation parameters that are specific to this turbine are observed. These critical operation parameters are, for example, the mechanical stresses of the gas turbine final stage by windage effects due to insufficient flow rate at high speeds, and any possible critical speed ranges.

Synchronization of the turbine with the electrical consumer mains at rated speed as well as operation at minimal load.

The power operation at constant speed occurs by means of control of the electrical power output while given limits for the gas turbine inlet temperature and the amounts of toxic components in the exhaust gases of the gas turbine are observed. For this and a suitable operation procedure with regard to the combustion, the air mass flow and the gas fuel mass flow are given reference values, which are both power and temperature dependent and realized by means of the position control values of the air inlet and combustion fuel inlet valves. The shut-down of the plant following the separation from the mains occurs by means of the SFC as a brake in order for the turbine to pass rapidly through any critical speed ranges as well as for the coast-down time to be shortened.

A specific problem encountered during start-up of the turbine of this type is that the turbine, that is accelerated by means of a relatively small air mass flow, can quickly reach speeds at which windage effects due to insufficient flow volume can occur in the final stages of the gas turbine. Windage is caused by a faulty air flow about the blades, which causes unusual mechanical stress in the blades. Furthermore, this type of turbine tends to develop an "astatic" behavior with respect to speed, which is essentially due to the lack of a counter torque. For this reason, a controlled operation with regard to speed is only possible by means of a particular braking torque, which in this case is produced electrically at the generator by the SFC. (In other turbine plants such as steam turbines or gas turbines, there are braking mechanisms provided by means of the long blades in the steam turbine and the ventilation of the generator cooling air or the compressor for the gas turbine). According to the state of the art, the air mass flow during start-up may be given and the speed is strictly controlled by means of equilibrium between drive and brake. This kind of speed control is ambiguous from the control point of view as either the drive (air inlet) or the brake (SFC) or both can be used as control means.

In order to avoid final stage windage due to particular air mass flows in the air expansion turbine, it is usually required that the air mass flow and the turbine speed are functionally connected. The setting of any controlled speed requires, depending on the current brake torque, a particular air mass flow. In the case of a small brake torque, the airflow rate can be so low such that windage can set in. In other words, for every air flow rate, there is a particular maximum speed, at which windage sets in. If during a start-up, the speed is chosen as a control variable and the brake torque is very small, then uncontrolled windage can easily occur. In order to set the speed and avoid windage, either the air mass flow or the SFC brake torque or both can be varied.

SUMMARY OF INVENTION

In view of the described state of the art, it is an object of the invention to provide a method of operation of turbines arranged in a CAES power generation plant, in particular for start-up and shut-down of the turbines. The method shall be particularly suitable for the operation of turbines that have no braking mechanism other than a SFC.

It is a particular object of the invention to provide a method that is unambiguous in the choice of variables for speed control. It is a further particular object of the invention to provide a turbine speed control by which windage effects and astatic behaviour with respect to speed are prevented in an air expansion turbine.

According to the invention, a method for operating a turbine arranged in a CAES power generation plant is based on two different concepts applied to different turbine speed ranges. In a lower turbine speed range, it comprises an open-loop control of the air mass flow alone according to which the turbine speed is left free to develop. Specifically, the method comprises for the lower speed range, the control of the air mass flow to the air expansion turbine by means of setting the air inlet valve as a function of time and/or any possible operational state requirements of the turbine. These requirements are in accordance with the pertaining operation concept of the CAES plant, such as turbine and recuperator warm-up, purging, acceleration etc. In a higher turbine speed range it comprises a closed-loop control of the turbine speed where the turbine speed is controlled by a speed controller acting on a static frequency converter (SFC). The turbine speed is limited, if necessary, by a SFC such as in the case when the speed reaches a given determined speed range that is critical in regard to windage effects or rotor dynamics. In the closed-loop control, the turbine speed is limited according to the momentary airflow rate that results from the air inlet valve position. As the airflow generates a high driving torque that tends to accelerate the turbine rotor, the turbine speed is limited to an airflow dependent set point value by means of the speed controller, which activates the variable braking torque of the SFC.

The method according to the invention is particularly applicable to the start-up of an expansion turbine arranged in a CAES power generation plant of the type described in connection with FIG. 1. The air mass flow that is necessary for purging, ignition, acceleration, and synchronization of the plant is set by means of the air inlet valve and subject to the open or closed-loop control depending on the range of turbine speed.

In the lower turbine speed range, the speed sets itself freely according to the air mass flow that results from the setting of the air inlet valve. In the higher turbine speed range, where windage effects can potentially occur, the speed is limited, only when necessary, by the speed controller. The speed controller is acted on by a speed reference value or turbine speed set point that is determined from a given target speed value and a speed limiting value. The speed limiting value $n_{lim}$ is determined by means of a windage calculation using a function of the actual air flow rate $f(m_A)$. The speed limiting value $n_{lim}$ is the turbine speed that is allowed for a given air mass flow at which windage does not occur. If the actual speed of the turbine tends to be greater than the speed reference or the speed limiting value, the speed controller activates a brake torque via the SFC, which dynamically counteracts the drive torque due to the given air mass flow.

In a further aspect of the method according to the invention, the speed control includes procedures for rapid passing through critical speed ranges. When during start-up of the expansion turbine, the lower limit of such a critical speed range is reached, a control circuit effects an immediate increase of the speed reference value to the upper limit of that critical speed range. Then, a ramp-shaped control of the necessary upper airflow rate is activated until the increased speed reference value for the turbine shaft is reached.

In a yet further aspect of the method, the speed is exclusively controlled by means of the SFC shortly before the speed for synchronization with the mains is reached by the turbine rotor. At this point in time, the air mass flow is held steady, and the speed is increased to synchronization speed by controlled reduction of the SFC braking torque.

The braking torque present at the moment of synchronization is physically transformed into the turbine minimal load. Its value can be stored for later braking procedures.

The method according to the invention is further applicable to a controlled shut-down of the air expansion turbine. In this regime, the SFC is activated by means of the speed controller until the turbine shaft speed is reduced to a speed that is safe for a free coast-down. Following a separation from the mains, the turbine could accelerate, which can result in overspeeds and risk of endangering the plant. In order to prevent such overspeeds, the SFC is activated by means of the speed controller. Its braking torque reduces the turbine speed to a suitably low value for a free coast-down. This value is typically approximately 40–50% of the full operating speed. Then the SFC is deactivated and the speed is left free to develop within the first speed range mentioned above. (In this first speed range the SFC may not be activated for electrical reasons.) In an aspect of this application of the method of operation, following the turbine shut-down, the turbine plant is purged before it is reignited.

BEST MODE OF INVENTION

The method of operation according to the invention depends on the turbine speed that it is applied to. The aforementioned lower turbine speed range comprises the speeds up to approximately 40% of the full operating speed and is the speed range where the SFC cannot be put into operation for electrical reasons (generator excitation). This may be the case, for example, during purging. Within this range of turbine rotor speeds, the air mass flow as set by the air inlet valves is set by open loop control according to a prescribed purging rule and the resulting turbine speed is left free to develop. In this speed range, there is typically also no potential windage effects.

The aforementioned higher speed range includes the speeds above the approximately 40% of the full operating speed and is that speed range within which the SFC can be activated. In this higher speed range the air mass flow is controlled according to the circuitry shown in FIG. 2.

Figure 1:
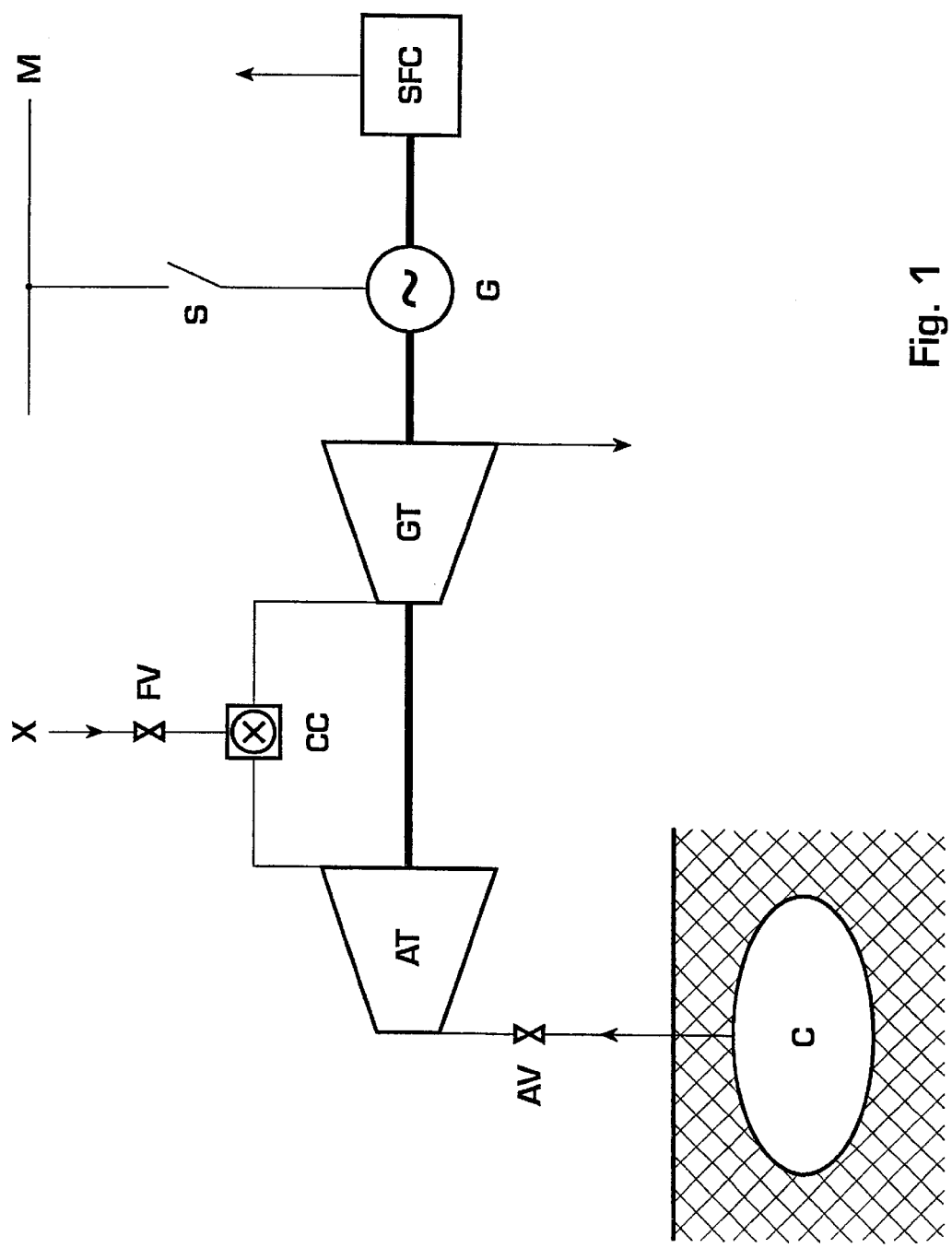
FIG. 1 shows a schematic of a CAES power generation plant with which an air expansion turbine can be operated by a method according to the invention.
Figure 2:
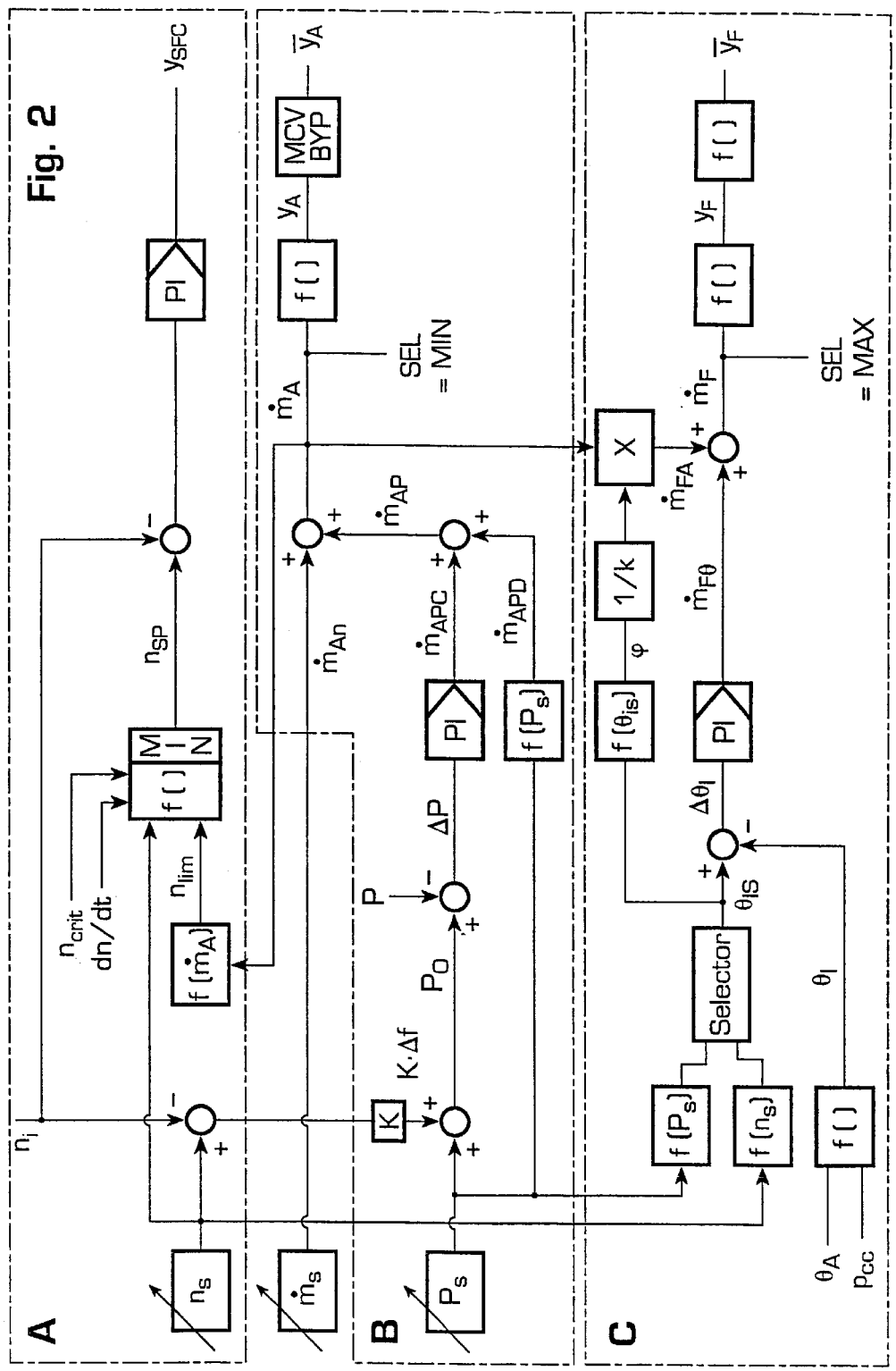
FIG. 2 shows a schematic of the control circuitry applied in the method of operation according to the invention.

FIG. 2 shows schematically the speed control circuitry with three units: unit A for the control of the turbine speed n, unit B for the control of the output power by means of control of the air flow via the air inlet valve position $y_A$, and unit C for the temperature control at the combustion chamber (CC) by means of a control of the fuel input $y_F$.

Unit A shows in particular those circuitry functions that enable the method of operation according to the invention. Units B and C each show circuitry functions as they are applied in conventional operating systems and that are essentially compatible with the method according to this invention.

Unit A for the speed control circuitry comprises an input for two different turbine speed values, the speed $n_i$, which is the actual turbine rotor speed and $n_s$, which is a target speed value. In the closed-loop control, the actual speed $n_i$ is compared with a speed set point value $n_{sp}$. If the actual speed $n_i$ exceeds this speed set point, the PI speed controller activates the braking torque $y_{SFC}$ of the SFC. The speed set point $n_{sp}$ is determined by the lower value (MIN value) of a given target speed $n_s$ and a speed limiting value $n_{lim}$. The limiting value $n_{lim}$ in turn is determined by a windage calculation according to a function $f(m_A)$ of the current air mass flow that is given by the air inlet valves.

The value of the air mass flow $m_A$ represents, in general terms, the sum of the speed dependent component $m_{An}$ plus the load dependent component $m_{AP}$. With $m_{AP}$ being nil (not active) during the start-up procedure, the speed limiting function $f(m_A)$ is only governed by $m_{An}$.

The function $f(m_A)$ yields a maximum allowed speed, the speed limiting value $n_{lim}$ for a given air mass flow $m_A$ at which windage effects do not occur. The value of $n_{lim}$ is also the maximum speed that is given to the speed set point $n_{sp}$. Hence by this control method the occurrence of windage effects is largely prevented. The SFC effects that the maximum turbine rotor speed $n_{lim}$ is not exceeded.

During start-up of the turbine the method comprises a procedure for rapid passing through critical speed ranges. Such critical speed ranges $n_{crit}$ are included in the determination of the speed set point $n_{sp}$. According to the method, the critical speed range is passed through according to a speed ramp function $dn/dt$. Such critical speed ranges are dependent on the part of the rotor, be it for the air turbine or the gas turbine rotor. Each of these has their own characteristic critical speed ranges, and coupled together they have further critical speed ranges.

Within such a critical speed range and in case the SFC has already been active, because the given reference value (given at the MIN-function shown in FIG. 2) served as a limiting value, the SFC torque may first be reduced in a controlled manner, such that the turbine shaft accelerates. This continues as long as the upper limiting speed that depends on the momentary airflow rate is not yet reached. After that, the speed is increased in a controlled manner by increasing the air mass flow. If necessary, the speed controller activates the SFC as a brake and contributes to the prevention of windage. This process finally ends at the upper limit of the critical speed range whereupon the normal start-up procedure is resumed.

As the turbine speed approaches for example 95% of the speed for synchronization, the air flow is stopped while the turbine speed is further increased to 100% by reducing the braking torque of the SFC.

Unit B shows schematically the method to calculate the drive signals $y_A$ for the setting of the main control valves (MCV) and bypass valves (BYP) at the air expansion turbine (AT). This method is part of the state of the art and is compatible with the method given in Unit A. The value of the air mass flow $m_A$ that is entered into the determination of the control signals of the inlet valves is determined by the power relevant air flow $m_{AP}$ and the speed relevant air flow $m_{An}$, which is directly related to the target air flow $m_s$. The load relevant mass air flow $m_{AP}$ is determined by, among other parameters, the variation in frequency $\Delta f$, which is the difference between the actual grid frequency and the nominal or rated grid frequency. For example in case of a reduction of the actual grid frequency, the turbine power is increased by means of a control of the air mass flow $m_{AP}$ and appropriate valve control.

Unit C shows a general circuitry according to the state of the art and compatible with the method according to Unit A calculates the position $y_F$ of the fuel valve for a dynamically enhanced closed-loop control of the gas turbine inlet temperature after the combustion chamber (CC).

What is claimed is:

1. Method of operation of a turbine arranged in a compressed air energy storage system comprising a cavern for storing compressed air, the turbine including an air expansion turbine, a gas turbine, and a generator arranged on a single shaft, and a static frequency converter (SFC) arranged on same shaft, the system further comprising an air inlet line for transporting an air mass flow from the cavern to the air expansion turbine, an air inlet valve arranged in the air inlet line, a further line leading from the air expansion turbine to a combustion chamber and from the combustion chamber to a gas turbine, and a fuel line for transporting fuel to the combustion chamber, a fuel inlet valve arranged in said fuel line, wherein the method of operation of the turbine comprises controlling the air mass flow to the air expansion turbine by means of setting the air inlet valve, where in a first turbine speed range the air mass flow is controlled by an open-loop control and the turbine speed is let to set itself freely according to the air mass flow rate that results from the setting of the air inlet valve, and in a second turbine speed range, that is greater than the first turbine speed range, the turbine speed is controlled by means of a closed-loop control according to the momentary air mass flow resulting from the air inlet valve position.

2. Method of operating a turbine according to claim 1 wherein in the second turbine speed range the turbine speed is limited by means of a speed controller acting on the static frequency converter (SFC) in the case that the turbine speed reaches a predetermined speed range that is critical for windage effects in the turbine.

3. Method of operating an air expansion turbine according to claim 2 wherein in the closed-loop control the turbine speed is limited by the speed controller, which is acted on by a speed limiting value that is determined by means of a windage calculation as a function of the current air mass flow, and in the case of the turbine speed exceeding the turbine speed limiting value, the speed controller activates the SFC.

4. Method of operating a turbine according to claim 3 wherein during start-up operation critical speed ranges are rapidly passed through in that, when the lower limit of a critical speed range is reached, a speed reference value is increased to the upper limit of the said critical speed range, and a ramp-shaped control of the necessary upper air flow rate is activated until said upper limit of the critical speed range is reached.

5. Method of operating a turbine according to claim 3 wherein, during start-up operation and shortly before synchronization with the mains, the air mass flow is held constant and the turbine speed is controlled by means of activating the SFC.

6. Method of operating a turbine according to claim 1 wherein the lower speed range includes the turbine speeds, for which the SFC cannot be activated or up to approximately 40% of the full operating turbine speed.

7. Method of operating an air expansion turbine according to claim 1 wherein the SFC is activated to facilitate a controlled turbine shut-down.

* * * * *